US010863092B2

(12) United States Patent
Tanaka et al.

(10) Patent No.: US 10,863,092 B2
(45) Date of Patent: Dec. 8, 2020

(54) IMAGING DEVICE AND METHOD FOR CORRECTING SHAKE OF CAPTURED IMAGE (71) Applicant: PANASONIC INTELLECTUAL PROPERTY MANAGEMENT CO., LTD., Osaka (JP)

(72) Inventors: Shogo Tanaka, Kanagawa (JP); Kenji Tabei, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/486,377

(22) PCT Filed: Jan. 17, 2018

(86) PCT No.: PCT/JP2018/001115
§ 371 (c)(1),
(2) Date: Aug. 15, 2019

(87) PCT Pub. No.: WO2018/159122
PCT Pub. Date: Sep. 7, 2018

(65) Prior Publication Data
US 2020/0186716 A1 Jun. 11, 2020

(30) Foreign Application Priority Data
Feb. 28, 2017 (JP) .................. 2017-037327

(51) Int. Cl.
*H04N 5/232* (2006.01)
*H04N 7/18* (2006.01)

(52) U.S. Cl.
CPC ..... *H04N 5/23267* (2013.01); *H04N 5/23258* (2013.01); *H04N 5/23261* (2013.01);
(Continued)

(58) Field of Classification Search
CPC ................................. H04N 5/23267
(Continued)

(56) References Cited

U.S. PATENT DOCUMENTS

| 2010/0073494 | A1* | 3/2010 | Hirose | H04N 5/243 348/208.4 |
| 2014/0184836 | A1* | 7/2014 | Watanabe | H04N 5/23287 348/208.5 |
| 2015/0138380 | A1 | 5/2015 | Tsubaki | |

FOREIGN PATENT DOCUMENTS

| JP | 3776514 | 5/2006 |
| JP | 4162333 | 10/2008 |

(Continued)

OTHER PUBLICATIONS

Official Communication issued in International Patent Application No. PCT/JP2018/001115, dated Mar. 27, 2018, along with English translation.

*Primary Examiner* — Joel W Fosselman
(74) *Attorney, Agent, or Firm* — Greenblum & Bernstein, P.L.C.

(57) ABSTRACT

Imaging device has a configuration provided with: a primary correction amount calculator that calculates a primary correction amount for correcting image shake in a current frame image based on a physical shake amount of the imaging device; a secondary correction amount calculator that calculates a secondary correction amount for correcting a search shake amount between the current frame image and a previous frame image which is one frame image before the current frame image; a correction amount selector that selects at least one of the primary correction amount and the secondary correction amount based on at least one of an imaging condition and the primary correction amount; and an image converter that performs a geometrical conversion with respect to the current frame image based on at least one
(Continued)

of the primary correction amount and the secondary correction amount which is selected by the correction amount selector.

6 Claims, 9 Drawing Sheets

(52) U.S. Cl.
CPC ......... *H04N 7/183* (2013.01); *H04N 5/23203* (2013.01); *H04N 5/23296* (2013.01); *H04N 5/23299* (2018.08)

(58) Field of Classification Search
USPC ...................................................... 348/208.2
See application file for complete search history.

(56) References Cited

FOREIGN PATENT DOCUMENTS

| JP | 2014-126861 | 7/2014 |
|----|-------------|--------|
| JP | 2015-100066 | 5/2015 |

\* cited by examiner

FRAME N-1

FIG. 5B

FRAME N

IMAGING DEVICE AND METHOD FOR CORRECTING SHAKE OF CAPTURED IMAGE

TECHNICAL FIELD

The present disclosure relates to an imaging device and a method for correcting shake of a captured image, and more specifically, to an imaging device that images captured images consisting of a plurality of frame images in time series by an imaging element and a method for correcting shake of the captured image imaged by the imaging device.

BACKGROUND ART

In the related art, for the purpose of correcting image shake in a captured image generated when a monitoring camera shakes, there is known a technology configured to detect a shake of a monitoring camera by a vibration detection means (vibration sensor) and instruct a shake correction mode with respect to a shake correction means for performing a shake correction in the captured image (PTL 1) in accordance with the analysis result of detected shake component.

For the purpose of correcting shake of an imaging camera that images a target area at each predetermined timing with a monitoring camera, there is known a technology configured to perform a pattern matching of a processing image using a template pattern created from a reference image when one of two frames of the image is set to the reference image and the other is set to the processing image, select a specific matching area using regularity of image shift (image shake) due to the camera shake, and calculate an camera shake amount from a movement vector thereof and correct the image shift (PTL 2).

CITATION LIST

Patent Literature

PTL 1: Japanese Patent No. 4162333
PTL 2: Japanese Patent No. 3776514

SUMMARY OF THE INVENTION

However, in the technology of PTL 1 described above, when performing a zoom-in imaging, even if a shake amount of the monitoring camera is small, the image shake in the captured image becomes large, and therefore the image shake in the captured image cannot be corrected. In the technology of PTL 2 described above, for example, when the brightness of the captured image is low due to imaging with the captured image with low illuminance such as nighttime, the pattern matching in the processing image becomes difficult, and thus the image shake in the captured image cannot be corrected. That is, in the related art, depending on an imaging condition, the image shake in the captured image cannot be corrected.

The present disclosure has been made in view of the problems of the related art as described above, and aims to provide an imaging device and a method for correcting shake of a captured image which can correct the image shake in the captured image according to an imaging condition.

According to an aspect of the present disclosure, there is provided an imaging device for imaging captured images consisting of a plurality of frame images in time series by an imaging element, the device including: a primary correction amount calculator that calculates a primary correction amount for correcting image shake in a current frame image based on a physical shake amount of the imaging device; a secondary correction amount calculator that calculates a secondary correction amount for correcting a search shake amount between the current frame image and a previous frame image which is one frame image before the current frame image; a correction amount selector that selects at least one of the primary correction amount and the secondary correction amount based on at least one of an imaging condition and the primary correction amount; and an image converter that performs a geometrical conversion with respect to the current frame image based on at least one of the primary correction amount and the secondary correction amount which is selected by the correction amount selector.

According to the present disclosure, it is possible to correct the image shake in a captured image in accordance with an imaging condition.

DESCRIPTION OF EMBODIMENTS

According to a first aspect of the present disclosure, there is provided an imaging device for imaging captured images consisting of a plurality of frame images in time series by an imaging element, the device including: a primary correction amount calculator that calculates a primary correction amount for correcting image shake in a current frame image based on a physical shake amount of the imaging device; a secondary correction amount calculator that calculates a secondary correction amount for correcting a search shake amount between the current frame image and a previous frame image which is one frame image before the current frame image; a correction amount selector that selects at least one of the primary correction amount and the secondary correction amount based on at least one of an imaging condition and the primary correction amount; and an image converter that performs a geometrical conversion with respect to the current frame image based on at least one of the primary correction amount and the secondary correction amount which is selected by the correction amount selector.

In the imaging device according to the first aspect, the correction amount used for correcting the image shake of the current frame image can be selected based on at least one of the imaging condition and the primary correction amount, thereby, it becomes possible to perform the image shake correction in the captured image in accordance with the imaging condition.

In a second aspect based on the above first aspect, the secondary correction amount calculator calculates the secondary correction amount using a reduced image of the current frame image and a reduced image of the previous frame image.

In the imaging device according to the second aspect, processing of calculating the secondary correction amount can be performed quickly by using the reduced image which has a small screen size.

In a third aspect based on the first aspect or the second aspect, the correction amount selector selects only the primary correction amount when the primary correction amount is equal to or larger than a predetermined threshold value.

In the imaging device according to the third aspect, when the shake amount of the imaging device is large, only the primary correction amount suitable for correcting large shake is used, and the secondary correction amount not suitable for correcting large shake is not used. Thereby, it is possible to perform the shake correction in the captured image in accordance with the imaging condition.

In a fourth aspect based on any one of aspects 1 to 3, the imaging condition includes at least one of on/off states of pan, tilt, and zoom operations, and a brightness of the captured image.

In the imaging device according to the fourth aspect, the correction amount to be used for the correction of the image shake in the current frame image can be selected based on the on/off states of pan, tilt, and zoom operations, or the brightness of the captured image. Thereby, it is possible to perform the shake correction in the captured image in accordance with the imaging condition.

In a fifth aspect based on the fourth aspect, the correction amount selector selects at least the primary correction amount when the pan, tilt, and zoom operations are off.

In the imaging device according to the fifth aspect, when the pan operation, the tilt operation, and the zoom operation are off, which is an imaging condition suitable for the shake correction using the primary correction amount, it is possible to perform the shake correction in the captured image using the primary correction amount. Thereby, it is possible to perform the shake correction in the captured image in accordance with the imaging condition.

In a sixth aspect based on the fourth aspect, the correction amount selector selects at least the secondary correction amount when the brightness of the captured image is equal to or higher than a predetermined threshold value.

In the imaging device according to the sixth aspect, when the brightness of the captured image is high, which is an imaging condition suitable for the correction of the image shake using the secondary correction amount, it is possible to perform the shake correction in the captured image using the secondary correction amount. Thereby, it is possible to perform the shake correction in the captured image in accordance with the imaging condition.

According to a seventh aspect of the present disclosure, there is provided a method for correcting shake of captured images consisting of a plurality of frame images acquired in time series by an imaging element, the method including: calculating a primary correction amount for correcting image shake in a current frame image based on a physical shake amount of the imaging device; calculating a secondary correction amount for correcting a search shake amount between the current frame image and a previous frame image which is one frame image before the current frame image; selecting at least one of the primary correction amount and the secondary correction amount based on at least one of an imaging condition and the primary correction amount; and performing a geometrical conversion with respect to the current frame image based on at least one of the primary correction amount and the secondary correction amount which is selected by the correction amount selector.

In the method for correcting shake of the captured image according to the seventh aspect, the correction amount used for correcting the image shake of the current frame image can be selected based on at least one of the imaging condition and the primary correction amount, thereby, it becomes possible to perform the image shake correction in the captured image in accordance with the imaging condition.

Hereinafter, exemplary embodiments of the present disclosure will be described with reference to the drawings.

In the present exemplary embodiment, a case where imaging device 1 according to the present disclosure is used as a surveillance camera will be described. Imaging device 1 is attached to, for example, a telephone pole, a pole or the like. Therefore, when the telephone pole or the pole shakes due to an earthquake, a wind, a traffic vibration or the like, imaging device 1 also shakes, so that image shake occurs in a captured image which is captured by imaging device 1.

Figure 1:
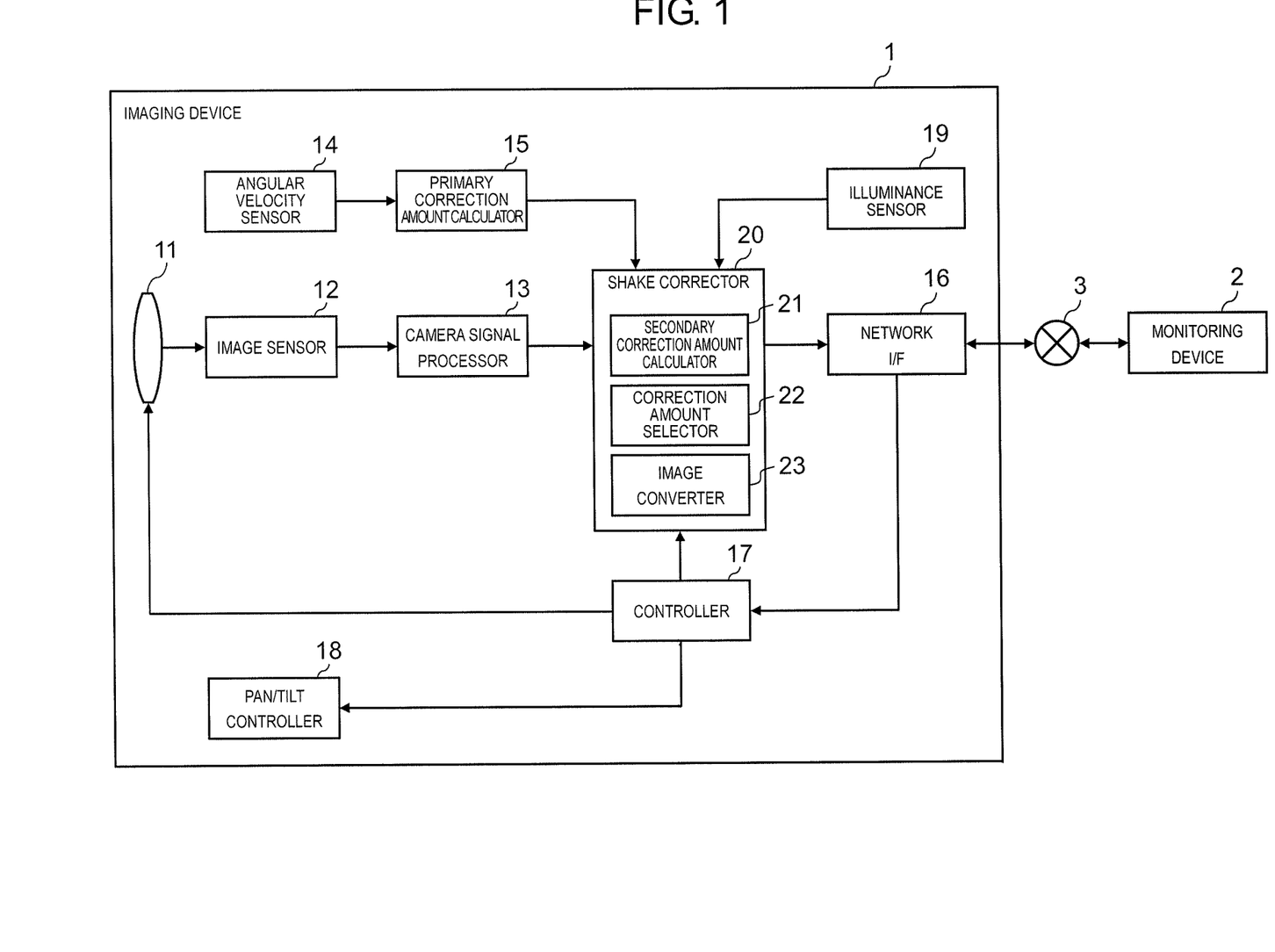
FIG. 1 is a schematic configuration diagram of an imaging device according to a present disclosure.

FIG. 1 is a schematic configuration diagram of imaging device 1 according to the present disclosure. Imaging device 1 is connected to monitoring device 2 (monitoring terminal) installed in a monitoring headquarters or the like via network 3. Imaging device 1 is provided with lens system 11 including a zoom lens, image sensor 12, camera signal processor 13, angular velocity sensor 14, primary correction amount calculator 15, network interface (I/F) 16, controller 17, pan/tilt controller 18, illuminance sensor 19, and shake corrector 20. Controller 17 can be configured with a processor, and shake corrector 20 and the like are realized by the processor executing a program stored in a memory (not shown).

Lens system 11 including the zoom lens condenses imaging light from a subject and forms an image of the subject on an imaging surface of image sensor 12. Image sensor 12 is a complementary metal oxide semiconductor (CMOS), and converts the image of the subject formed on the imaging surface into an electrical signal at a predetermined frame period (imaging period). Camera signal processor 13 performs various signal processing with respect to the image signal generated by image sensor 12 and generates a frame image (image data).

Angular velocity sensor 14 detects how much an angle of imaging device 1 changes per unit time, that is, detects a physical shake amount. Specifically, a rotational angular velocity in a left-and-right direction (pan direction) of imaging device 1 and a rotational angular velocity in an up-and-down direction (tilt direction) of imaging device 1 are detected, respectively. Based on the rotational angular velocity detected by angular velocity sensor 14, primary correction amount calculator 15 calculates a correction amount (hereinafter referred to as "primary correction amount") for correcting image shake in a frame at current point (hereinafter referred to as "current frame"). Similarly, primary correction amount calculator 15 calculates a correction amount (that is, a primary correction amount) for correcting the image shake of a frame which is one frame image before the current frame (hereinafter referred to as a "previous frame").

Figure 2:
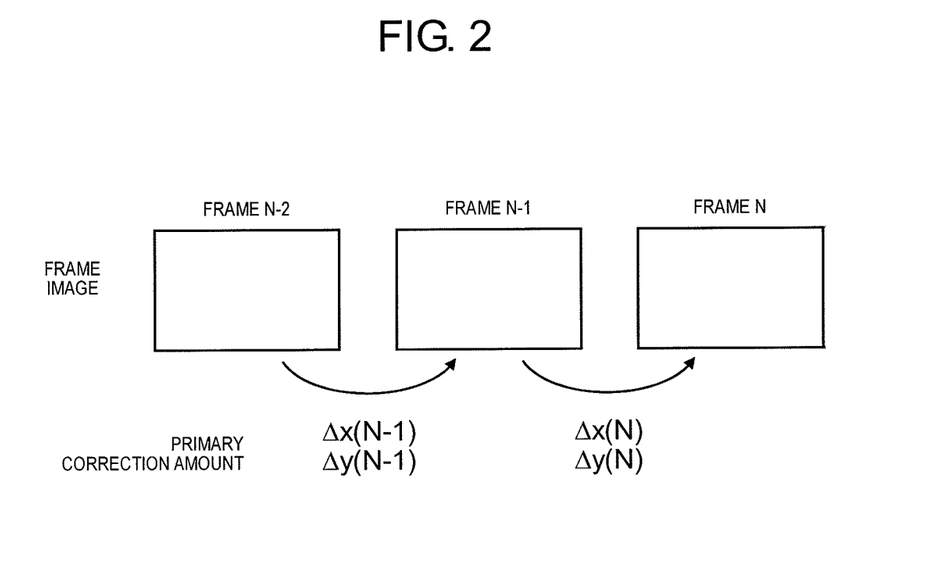
FIG. 2 is a diagram for explaining a relationship between a rotational angular velocity and a primary correction amount.

FIG. 2 is a diagram for explaining a relationship between a rotational angular velocity and a primary correction amount. Primary correction amount calculator 15 obtains an average movement amount ($\Delta x$, $\Delta y$) of the subject in a frame image in the left-and-right direction (x direction) and the up-and-down direction (y direction), between the current frame (frame N) and the previous frame (frame N−1). The average movement amount ($\Delta x$, $\Delta y$) can be obtained by converting a rotational angular velocity of angular velocity sensor 14 into a displacement amount of the subject in the x direction and the y direction using a known method in the related art. The obtained average movement amount ($\Delta x$, $\Delta y$) becomes a primary correction amount "$\Delta x(N)$, $\Delta y(N)$" for correcting the image shake of the current frame (frame N).

Similarly, primary correction amount calculator 15 obtains an average movement amount ($\Delta x$, $\Delta y$) of the subject in a frame image, between the previous frame (frame N−1) and a frame which is one before the previous frame (frame N−2). The obtained average movement amount ($\Delta x$, $\Delta y$) becomes the primary correction amount "$\Delta x(N-1)$, $\Delta y(N-1)$" for correcting the image shake of the previous frame (N−1). The primary correction amount calculated by primary correction amount calculator 15 is input to shake corrector 20.

Network I/F 16 is an interface for connecting imaging device 1 to network 3. Network I/F 16 receives a command for instructing a shake correction in the captured image and a command for instructing each operation of a zoom operation, a pan operation, and a tilt operation from monitoring device 2 via network 3. Each command received by network I/F 16 from monitoring device 2 is input to controller 17. The network I/F 16 also transmits shake corrected image 43 (see FIG. 3), which will be described later, generated by shake corrector 20 to monitoring device 2 via network 3.

Controller 17 is for collectively controlling each processing of imaging device 1 including the shake correction of the captured image, the zoom operation, the pan operation, and the tilt operation, and controls each processing of imaging device 1 based on a control program stored in advance in a read only memory (ROM) (not shown) and each command input from network I/F 16. Controller 17 controls the pan operation and the tilt operation in a pan/tilt mechanism (not shown) by controlling pan/tilt controller 18. Controller 17 controls the zoom operation of the zoom lens included in lens system 11 by controlling zoom lens controller (not shown).

Illuminance sensor 19 is for detecting the brightness (illuminance) around imaging device 1 at the time of imaging. A detection result of illuminance sensor 19 is input to shake corrector 20.

Shake corrector 20 has: secondary correction amount calculator 21 that calculates a correction amount (hereinafter referred to as "secondary correction amount") for correcting a displacement amount of the subject between a frame image of the current frame and a frame image of the previous frame; correction amount selector 22 that selects at least one of the primary correction amount and the secondary correction amount based on at least one of the imaging condition and the primary correction amount; and image converter 23 that corrects the image shake, when at least one of the primary correction amount and the secondary correction amount is selected by correction amount selector 22, by performing the geometrical conversion with respect to the frame image of the current frame based on at least one of the selected primary correction amount and the secondary correction amount.

The imaging condition includes, for example, the on/off states of pan, tilt, and zoom operations at the time of imaging, or the brightness of the captured image, or the like. The brightness of the captured image can be obtained based on the detection result of illuminance sensor 19. The brightness of the captured image may be obtained based on a luminance of the captured image acquired by image sensor 12 without using illuminance sensor 19.

Figure 3:
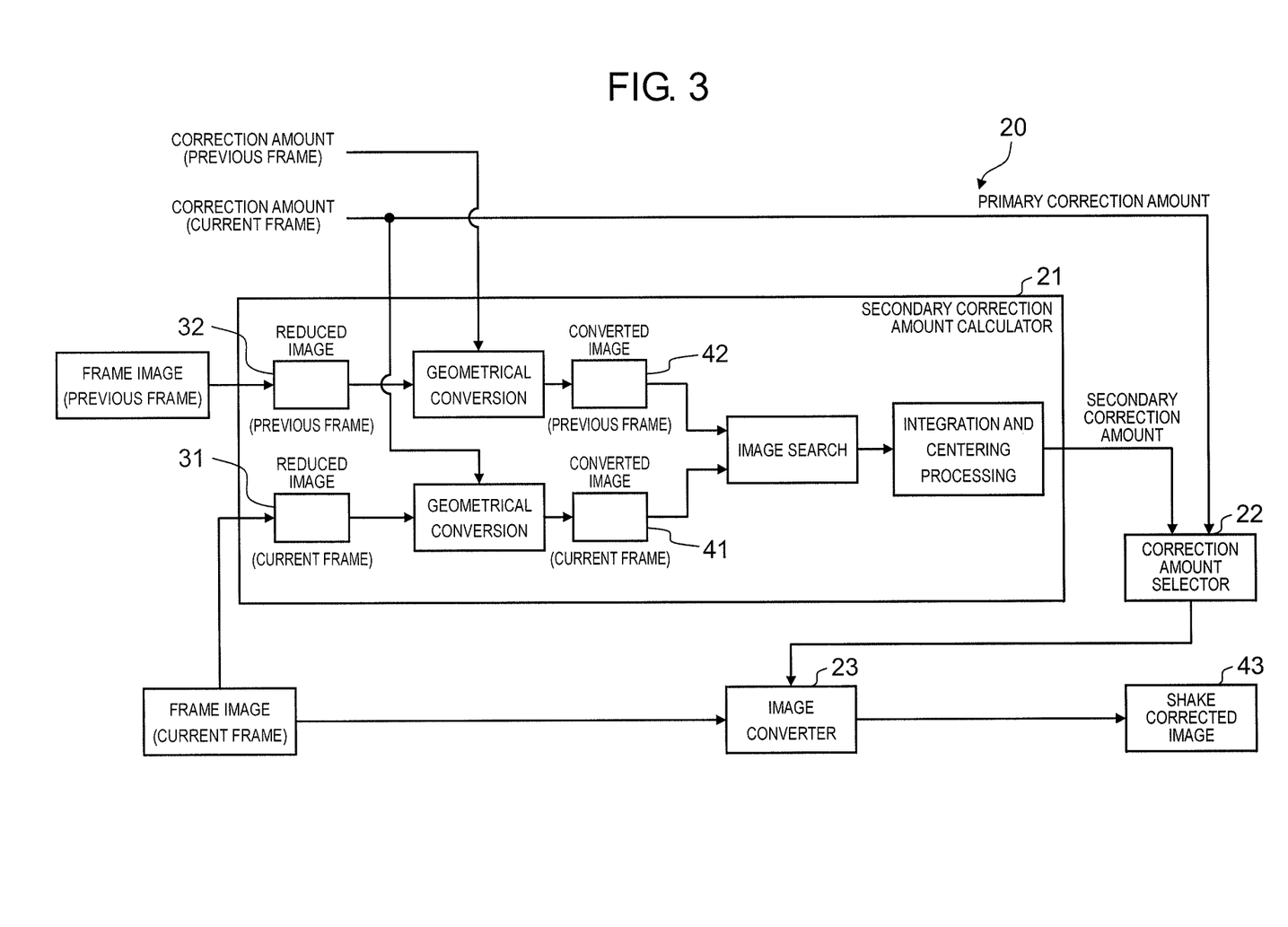
FIG. 3 is a diagram showing processing in a shake corrector.
Figure 4:
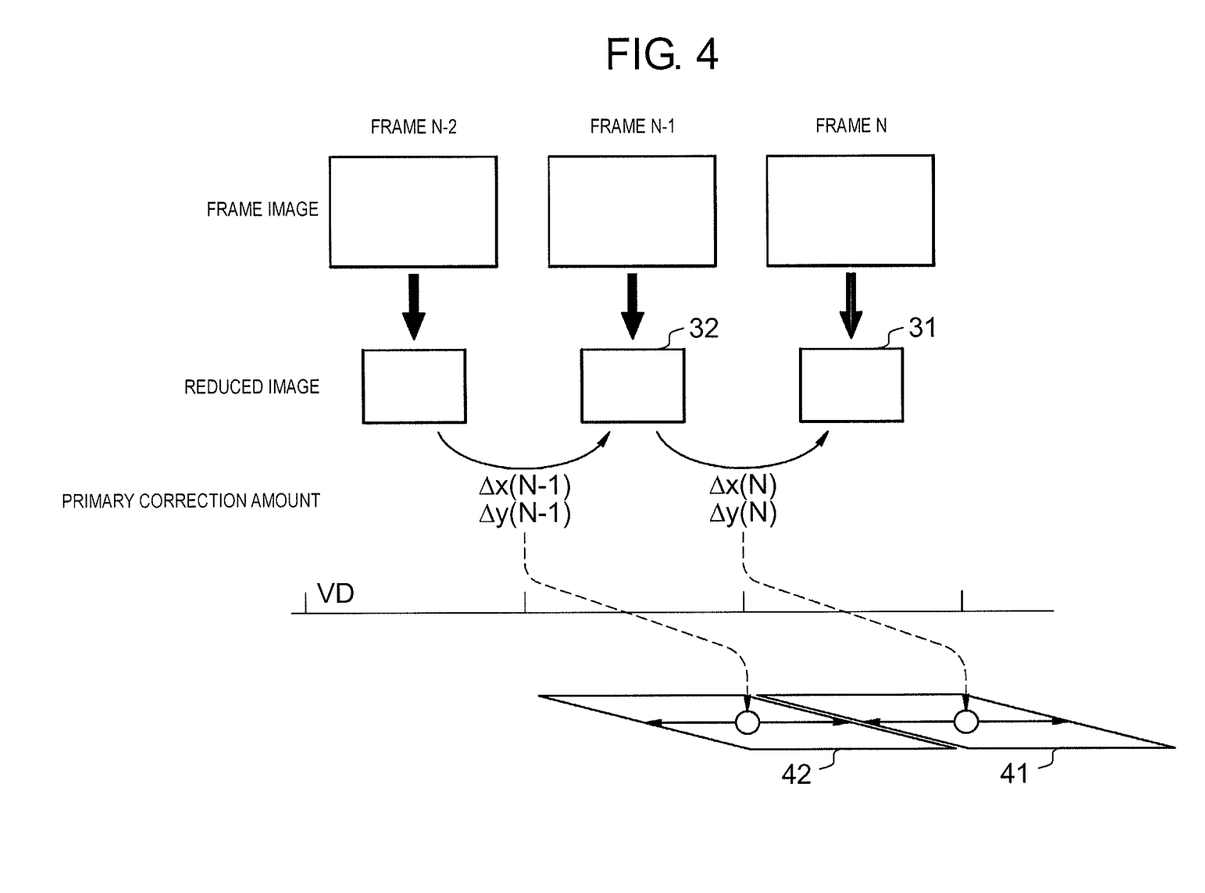
FIG. 4 is a diagram for explaining a calculation of a secondary correction amount in a secondary correction amount calculator.
Figure 5A:
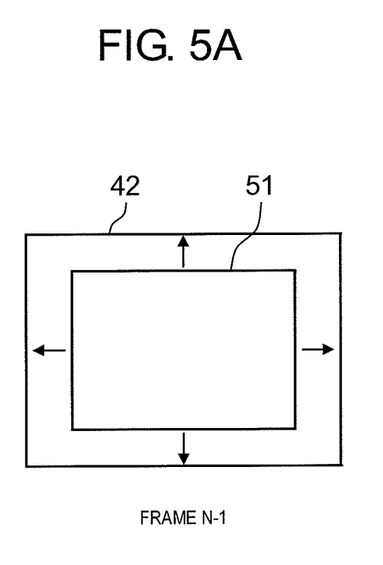
FIG. 5A is a diagram for explaining a calculation of a secondary correction amount in the secondary correction amount calculator.
Figure 5B:
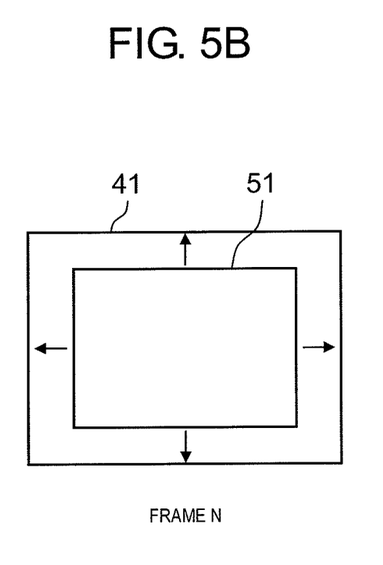
FIG. 5B is a diagram for explaining a calculation of the secondary correction amount in the secondary correction amount calculator.

FIG. 3 is a diagram showing processing in shake corrector 20, and FIGS. 4, 5A, and 5B are diagrams for explaining a calculation of the secondary correction amount in secondary correction amount calculator 21. Reference mark VD in FIG. 4 is a vertical synchronization signal of each frame image.

First, secondary correction amount calculator 21 acquires frame images (image data) of the current frame (frame N) and the previous frame (frame N−1) from camera signal processor 13. Then, reduced images 31 and 32 are generated by reducing the frame image of each frame at a predetermined ratio. Specifically, as shown in FIG. 4, reduced image 31 is generated from the frame image of the current frame (frame N), and reduced image 32 is generated from the frame image of the previous frame (frame N−1).

Subsequently, from primary correction amount calculator 15, secondary correction amount calculator 21 acquires a primary correction amount "$\Delta x(N)$, $\Delta y(N)$" of the current frame (frame N) and a primary correction amount "$\Delta x(N-1)$, $\Delta y(N-1)$" of the previous frame (frame N−1). Then, based on the acquired primary correction amount, the geometric conversions are performed with respect to reduced image 31 of the current frame (frame N) and reduced image 32 of the previous frame (frame N−1). Hereinafter, an image after the geometrical conversion is referred to as a converted image.

Specifically, as shown in FIG. 4, converted image 41 is generated by geometrically converting reduced image 31 of the current frame (frame N), and converted image 42 is generated by geometrically converting reduced image 32 of the previous frame (frame N−1). In the present exemplary embodiment, since reduced images 31 and 32 having small screen sizes are used, the geometrical conversion can be performed at high speed as compared with a case where reduced images 31 and 32 are not used. In this geometrical conversion, when there is no problem in processing speed and sufficient memory can be secured, the reduced image may not be used.

Next, secondary correction amount calculator 21 obtains a displacement amount of the subject between the current frame (frame N) and the previous frame (frame N−1), that is, a search shake amount by performing an image search using a known template matching method in the related art with respect to converted image 41 of the current frame (frame N) and converted image 42 of the previous frame (frame N−1).

FIGS. 5A and 5B are diagrams for explaining the image search in secondary correction amount calculator 21. As shown in FIGS. 5A and 5B, the search shake amount between the current frame (frame N) and the previous frame (frame N−1) can be obtained by placing template 51, which has a frame with a predetermined size, on converted images 41 and 42, and by finely moving template 51 in the horizontal direction (x direction) and the vertical direction (y direction) to perform the image search. In the present exemplary embodiment, since the image search is performed with respect to converted images 41 and 42 generated from reduced images 31 and 31, the image search processing can be performed at high speed as compared with the case where reduced images 31 and 32 are not used.

Then, by performing known integration processing and centering processing in the related art with respect to the search shake amount obtained by the image search, a correction amount (that is, the secondary correction amount) for correcting the search shake amount is calculated.

Figure 6:
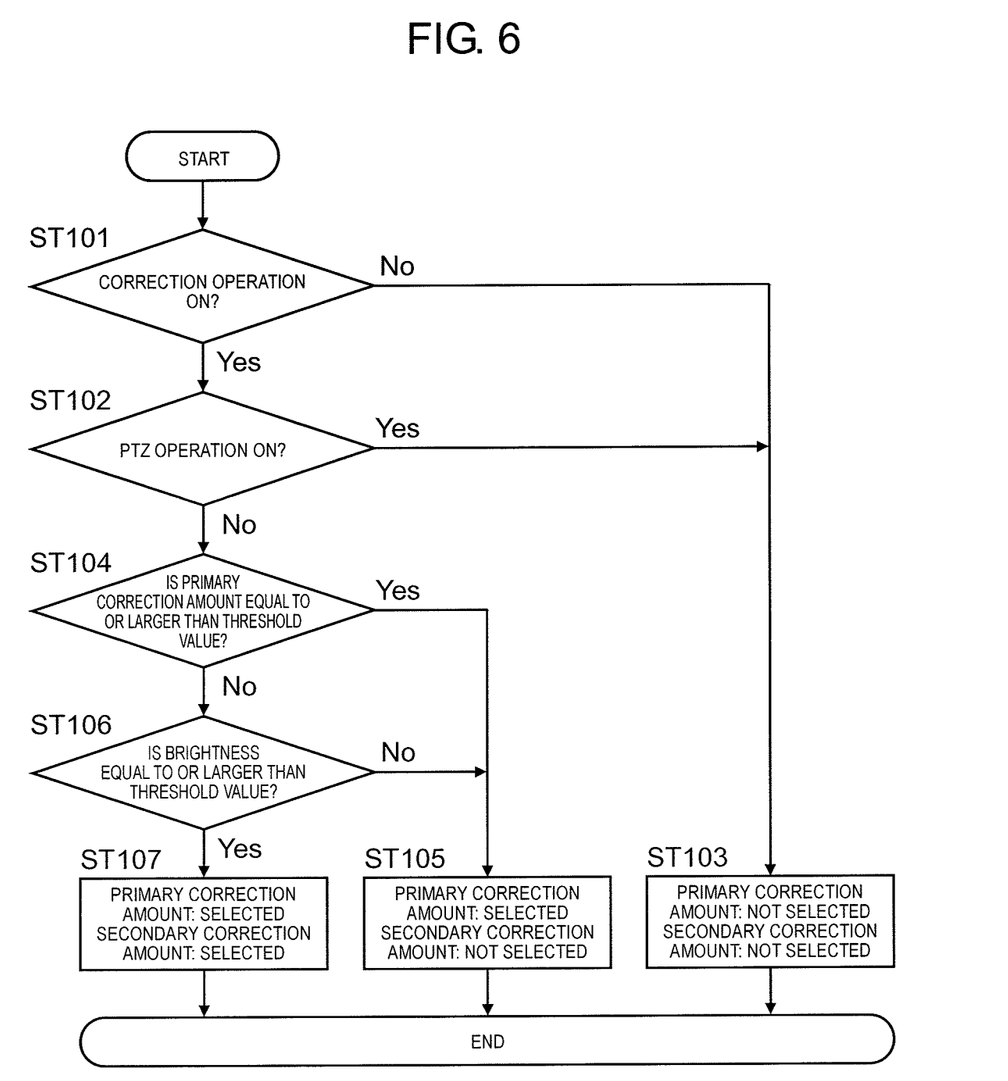
FIG. 6 is a flowchart for explaining processing in a correction amount selector.

FIG. 6 is a flowchart for explaining processing in correction amount selector 22. Based on at least one of the on/off states of pan, tilt, and zoom operations, the brightness of the captured image, and the magnitude of the primary correction amount, correction amount selector 22 selects only the primary correction amount, or selects both the primary correction amount and the secondary correction amount, or selects not to perform the shake correction in the captured image. Although not shown in the flowchart of FIG. 6, correction amount selector 22 may be able to select only the secondary correction amount. Selection of only the secondary correction amount is effective when the primary correction amount is small and the effect of the shake correction based on the primary correction amount is small.

First, in step ST101, it is determined whether or not the correction operation of the image shake in the captured image is to be performed in imaging device 1. This determination is performed based on the presence or absence of a command for instructing the shake correction in the captured image input from controller 17. The process proceeds to step ST102 when it is determined that the correction operation of the image shake is to be performed (step ST101: Yes), and the process proceeds to step ST103 when it is determined that the correction operation of the image shake is not to be performed (step ST101: No).

In step ST102, it is determined whether or not any one of the pan, tilt, and zoom operations (hereinafter referred to as "PTZ operation") is on. This determination is performed based on the presence or absence of a command for instructing the PTZ operation input from controller 17. The process proceeds to step ST103 when it is determined that any operation of PTZ is on (step ST102: Yes), and the process proceeds to step ST104 when it is determined that any operation of PTZ is not on (step ST102: No).

In step ST103, it is selected not to perform the shake correction in the captured image. That is, neither the primary correction amount nor the secondary correction amount is selected.

In step ST104, it is determined whether or not the primary correction amount calculated by primary correction amount calculator 15 is equal to or larger than the predetermined threshold value (reference value). The process proceeds to step ST105 when it is determined that the primary correction amount is equal to or larger than the threshold value (step ST104: Yes), and the process proceeds to step ST106 when it is determined that the primary correction amount is not equal to or larger than the threshold value (step ST104: No).

In step ST106, it is determined whether or not the brightness of the captured image is equal to or higher than the predetermined threshold value (reference value). The brightness of the captured image is obtained based on the detection result of illuminance sensor 19 or obtained based on the luminance of the captured image. The process proceeds to step ST107 when it is determined that the brightness of the captured image is equal to or higher than the threshold value (step ST106: Yes), and the process proceeds to step ST105 when it is determined that the brightness of the captured image is not equal to or higher than the threshold value (step ST106: No).

In step ST105, only the primary correction amount is selected, and the secondary correction amount is not selected.

In step ST107, both the primary correction amount and the secondary correction amount are selected.

Based on the on/off states of PTZ operation, the brightness of the captured image, and the magnitude of the primary correction amount, correction amount selector 22 selects only the primary correction amount, or selects both the primary correction amount and the secondary correction amount, or selects not to perform the shake correction in the captured image. During the PTZ operation, since the imaging angle and imaging magnification of the captured image change so that it is not suitable for correction of the image shake in the captured image, the shake correction in the captured image is not performed. When the primary correction amount is large, that is, when the shake amount of imaging device 1 is large, the effect of the shake correction based on the secondary correction amount is small, so only the primary correction amount is selected and the secondary correction amount is not selected. When the brightness of the captured image is low, it is difficult to perform the image search using the template matching method, so the secondary correction amount is not selected.

Figure 7A:
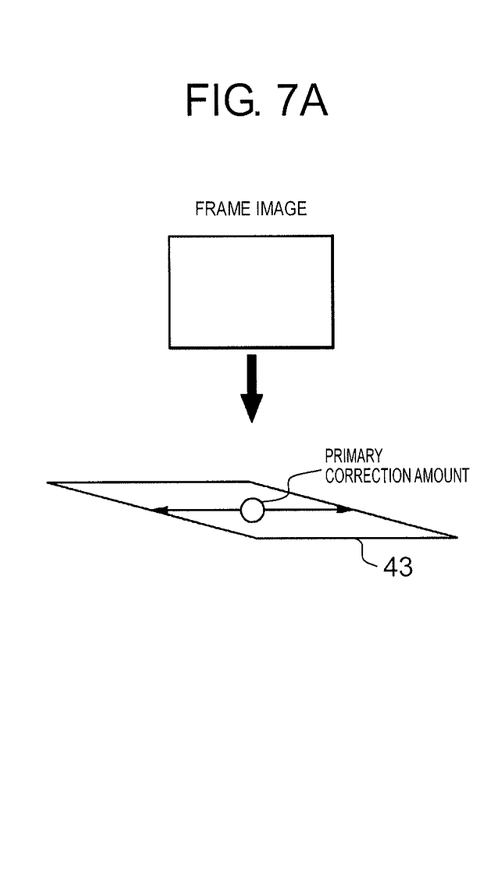
FIG. 7A is a diagram for explaining geometrical conversion processing based on the primary correction amount in an image converter.
Figure 7B:
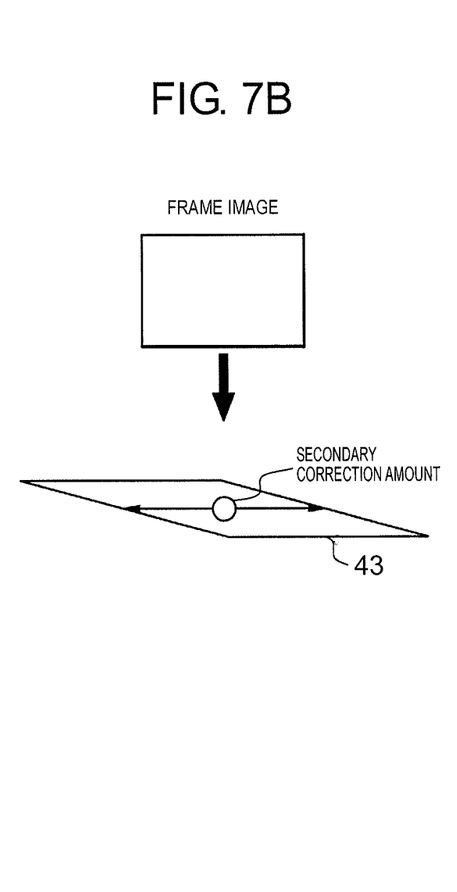
FIG. 7B is a diagram for explaining the geometrical conversion processing based on the secondary correction amount in the image converter.
Figure 7C:
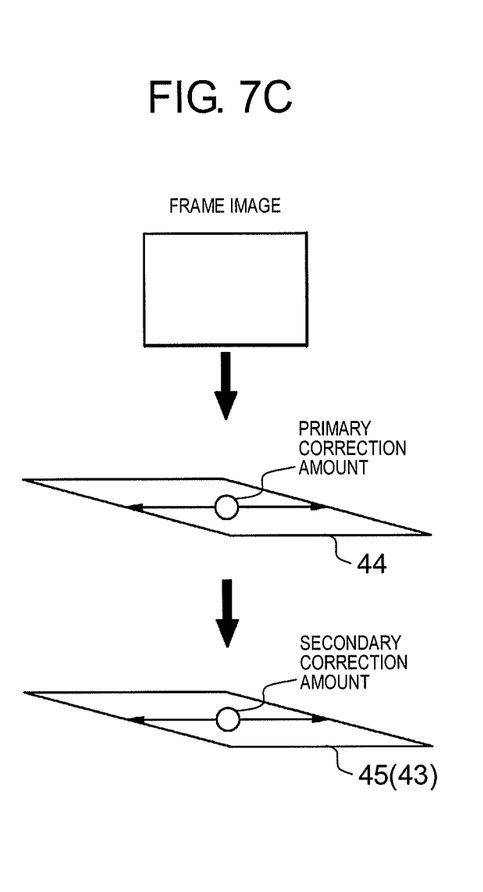
FIG. 7C is a diagram for explaining the geometrical transformation processing by both the primary correction amount and the secondary correction amount in the image converter.

FIGS. 7A, 7B, and 7C are diagrams for explaining geometrical conversion processing in image converter 23. When the primary correction amount is selected in correction amount selector 22, as shown in FIG. 7A, shake corrected image 43, in which the image shake is corrected, is generated by performing the geometrical conversion with respect to the frame image of the current frame (frame N) based on the primary correction amount.

When the secondary correction amount is selected in correction amount selector 22, as shown in FIG. 7B, shake corrected image 43, in which the image shake is corrected, is generated by performing the geometrical conversion with respect to the frame image of the current frame (frame N) based on the secondary correction amount. When both the primary correction amount and the secondary correction amount are selected in correction amount selector 22, as shown in FIG. 7C, secondary corrected image 45, in which small image shake is further corrected, is generated by performing the geometrical conversion with respect to the frame image of the current frame (frame N) based on the primary correction amount to generate primary corrected image 44, in which large image shake is corrected, and then performing the geometrical conversion based on the secondary correction amount with respect to primary corrected image 44. Secondary corrected image 45 becomes shake corrected image 43.

Figure 8:
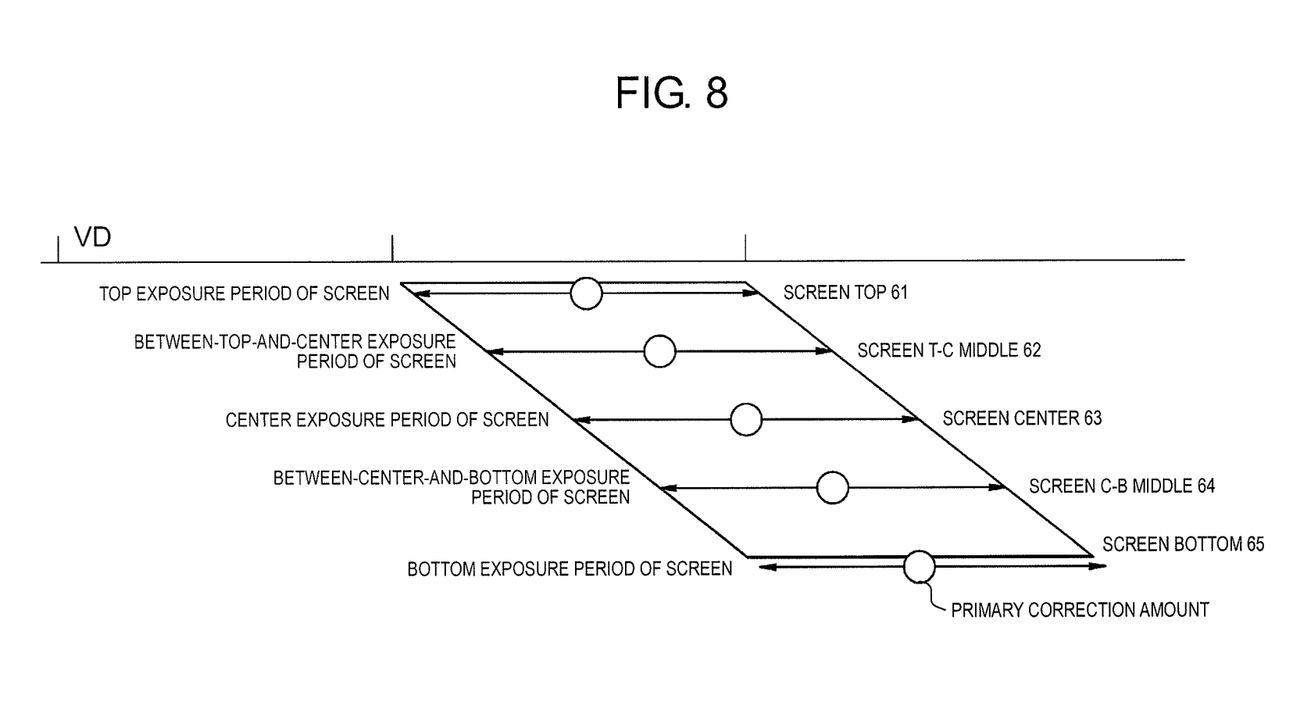
FIG. 8 is a diagram showing an example in which a frame image is divided into five areas.

In practice, in order to correct rolling shutter distortion, a frame screen (frame image) is divided into a plurality of areas, and the geometrical conversion is applied to each of the plurality of divided areas. FIG. 8 is a diagram showing an example in which a frame screen is divided into five areas. As shown in FIG. 8, the frame screen is divided into five areas of screen TOP 61, screen T-C middle 62, screen CENTER 63, screen C-B middle 64, and screen BOTTOM 65 corresponding to each exposure period of a top exposure period of the screen, a between-top-and-center exposure period of the screen, a center exposure period of the screen, a between-center-and-bottom exposure period of the screen, and a bottom exposure period of the screen. Then, the geometrical conversion is performed to each of areas 61 to 65.

Figure 9:
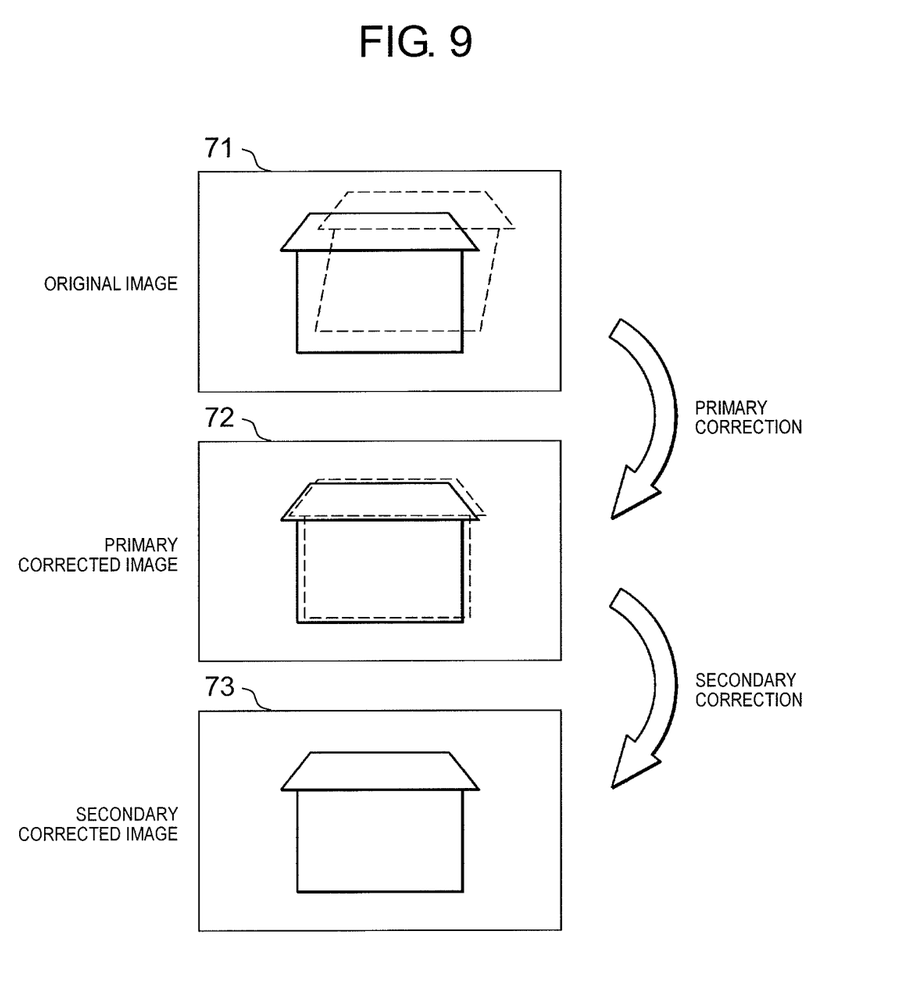
FIG. 9 is a diagram for explaining a correction of image shake in a captured image of a house.

FIG. 9 is a diagram showing an example in which image shake in the captured image of a house is corrected using both the primary correction amount and the secondary correction amount. As shown in FIG. 9, first, primary corrected image 72 is generated by performing the shake correction (primary correction) based on the primary correction amount with respect to original image 71 which is a captured image. By this primary correction, it is possible to correct large image shake in the captured image due to large shake of imaging device 1 and rolling shutter distortion caused by the large shake of imaging device 1. The primary correction is effective even in a case of imaging under a low illuminance imaging environment such as nighttime.

Secondary corrected image 73 is generated by performing the shake correction (secondary correction) with respect to primary corrected image 72 based on the secondary correction amount. By this secondary correction, it is possible to correct fine image shake of primary corrected image 72 which could not be removed by the primary correction. Such secondary correction is effective for correcting the image shake when the zoom-in operation is performed. When the zoom-in operation is performed, the image shake of the captured image may be large even if the shake amount (that is, the primary correction amount) of imaging device 1 is small.

Although the present disclosure has been described above based on specific exemplary embodiments, these exemplary embodiments are merely examples, and the present disclosure is not limited by these exemplary embodiments. In addition, not all of the components of the imaging device and the method for correcting shake of the captured image according to the present disclosure described in the above exemplary embodiments are necessarily essential, and it is possible to make an appropriate selection at least without departing from the scope of the present disclosure.

INDUSTRIAL APPLICABILITY

An imaging device and a method for correcting shake of a captured image according to the present disclosure are useful as an imaging device and a method for correcting shake of a captured image that can correct the image shake in a captured image in accordance with an imaging condition.

REFERENCE MARKS IN THE DRAWINGS

1 IMAGING DEVICE
2 MONITORING DEVICE
3 NETWORK
11 LENS SYSTEM
12 IMAGE SENSOR
13 CAMERA SIGNAL PROCESSOR
14 ANGULAR VELOCITY SENSOR
15 PRIMARY CORRECTION AMOUNT CALCULATOR
16 NETWORK INTERFACE (I/F)
17 CONTROLLER
18 PAN/TILT CONTROLLER
19 ILLUMINANCE SENSOR
20 SHAKE CORRECTOR
21 SECONDARY CORRECTION AMOUNT CALCULATOR
22 CORRECTION AMOUNT SELECTOR
23 IMAGE CONVERTER

The invention claimed is:

1. An imaging device for imaging captured images including a plurality of frame images in time series by an imaging element, the device comprising:
a processor; and
a memory that stores an instruction, the imaging device further comprising, as a configuration when the processor executes the instruction stored in the memory:
a primary correction amount calculator that calculates a primary correction amount for correcting image shake in a current frame image based on a physical shake amount of the imaging device;
a secondary correction amount calculator that calculates a secondary correction amount for correcting a search shake amount between the current frame image and a previous frame image which is one frame image before the current frame image, by using a reduced image of the current frame image and a reduced image of the previous frame image;
a correction amount selector that selects at least one of the primary correction amount and the secondary correction amount based on at least one of an imaging condition and the primary correction amount; and
an image converter that performs a geometrical conversion with respect to the current frame image based on at least one of the primary correction amount and the secondary correction amount which is selected by the correction amount selector.

2. The imaging device of claim 1,
wherein the correction amount selector selects only the primary correction amount when the primary correction amount is equal to or larger than a predetermined threshold value.

3. The imaging device of claim 1,
wherein the imaging condition includes at least one of on/off states of pan, tilt, and zoom operations, and a brightness of the captured image.

4. The imaging device of claim 3,
wherein the correction amount selector selects at least the primary correction amount when the pan, tilt, and zoom operations are off.

5. The imaging device of claim 3,
wherein the correction amount selector selects at least the secondary correction amount when the brightness of the captured image is equal to or higher than a predetermined threshold value.

6. A method of causing a processor to correct shake of captured images including a plurality of frame images acquired in time series by an imaging element, the method comprising, when the processor executes an instruction stored in a memory:
calculating a primary correction amount for correcting image shake in a current frame image based on a physical shake amount of the imaging device;
calculating a secondary correction amount for correcting a search shake amount between the current frame image and a previous frame image which is one frame image before the current frame image, by using a reduced image of the current frame image and a reduced image of the previous frame image;

selecting at least one of the primary correction amount and the secondary correction amount based on at least one of an imaging condition and the primary correction amount; and performing a geometrical conversion with respect to the current frame image based on at least one of the primary correction amount and the secondary correction amount which is selected.

\* \* \* \* \*